United States Patent [19]
Steiner

[11] Patent Number: 5,927,911
[45] Date of Patent: Jul. 27, 1999

[54] AUTOMATIC FLUID ACTUATED SPOTFACING AND COUNTERBORING TOOL

[75] Inventor: Rudolph Steiner, Fairport, N.Y.

[73] Assignee: R. Steiner Technologies, Inc., Rochester, N.Y.

[21] Appl. No.: 09/174,664

[22] Filed: Oct. 19, 1998

[51] Int. Cl.$^6$ ................................................ B23B 51/00
[52] U.S. Cl. ........................................ 408/159; 408/187
[58] Field of Search ........................ 408/57, 58, 159, 408/187, 188

[56] References Cited

U.S. PATENT DOCUMENTS

| | | | |
|---|---|---|---|
| 3,019,712 | 2/1962 | Winberry, Jr. | 408/159 |
| 3,806,271 | 4/1974 | Ishiguro et al. | 408/159 |
| 4,411,324 | 10/1983 | Liebig | 408/159 |
| 4,729,699 | 3/1988 | Frazzoli | 408/159 |
| 5,209,145 | 5/1993 | Baudermann | 408/180 |
| 5,829,925 | 11/1998 | Nordstrom | 408/57 |
| 5,839,860 | 11/1998 | Steiner | 408/180 |
| 5,848,860 | 12/1998 | Steiner | 408/159 |

*Primary Examiner*—Andrea L. Pitts
*Assistant Examiner*—Adesh Bhargava
*Attorney, Agent, or Firm*—Shlesinger, Fitzsimmons & Shlesinger

[57] ABSTRACT

A spotfacing and counterboring tool has therethrough an axial bore communicating at one end with a recess containing a pivotal cutter blade connected to an actuator which is reciprocable on the tool between a first limited position in which it moves the cutter blade to an inoperative position within the recess, and to a second limited position in which it moves the cutter blade to an operative position in which the blade projects out of the recess. An expansion chamber in the tool communicates at one end with the axial bore in the tool, and at its opposite end is closed by the reciprocable actuator, which normally is urged resiliently into its first position, when the tool is not being used, and in which position it places the chamber in its contracted mode. The end of the tool remote from its end containing the cutter blade is disposed to be connected to a machine tool for rotation thereby selectively in opposite directions, and is disposed also to have the adjacent end of its axial bore connected to a supply of coolant fluid under pressure, which flows into the axial bore in the tool, and into the expansion chamber to force the actuator to its second limit position, thereby moving the cutter blade to its operative position, and also causing a portion of the fluid to flow into the recess and cool the now-active cutter blade.

13 Claims, 2 Drawing Sheets

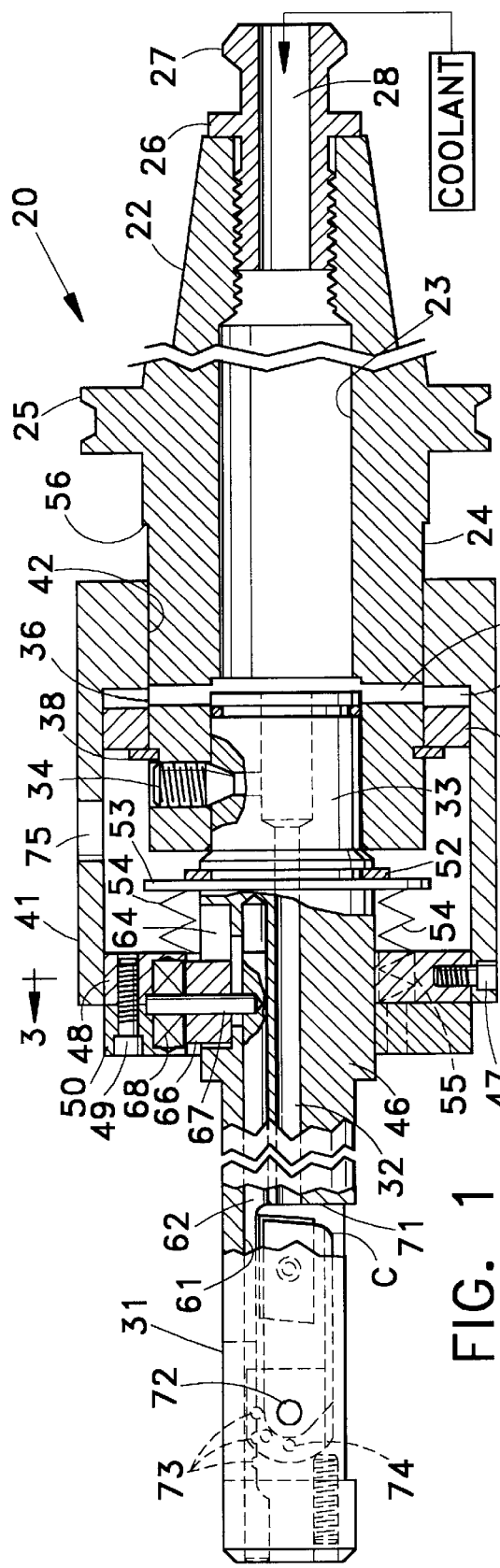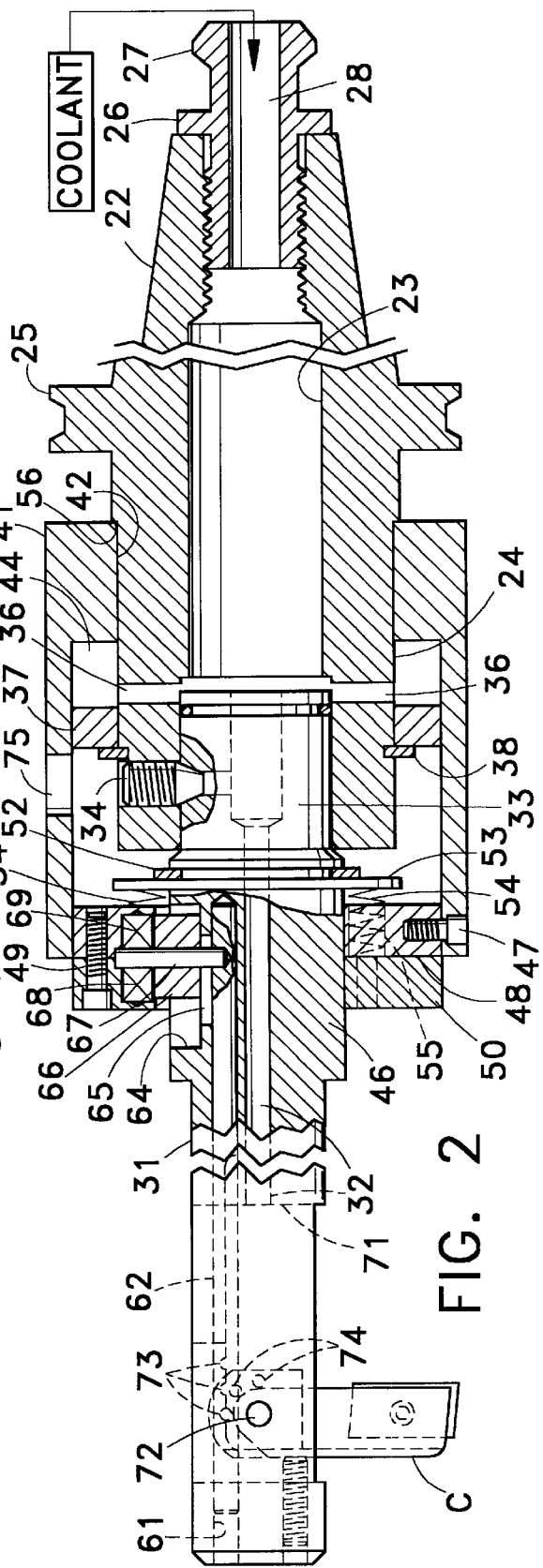

AUTOMATIC FLUID ACTUATED SPOTFACING AND COUNTERBORING TOOL

BACKGROUND OF THE INVENTION

This invention relates to back and front spotfacing and counterboring tools, and more particularly to an improved such tool having a fluid pressure actuated tool bit which is automatically pivoted between operative and inoperative positions. Moreover, this invention relates to a novel method of utilizing a pressurized coolant fluid for automatically actuating the tool bit of an improved tool of the type disclosed herein.

There are currently available in the marketplace a variety of spotfacing and counterboring tools having tool bits which are pivotal relative to the tool body between inoperative positions in which they are housed within recesses within the tool body, and operative positions in which they project outwardly from the tool bodies into work cutting positions. In my pending U.S. patent application Ser. No. 08/775,576 this movement of a tool bit between operative and inoperative positions is effected by a fly wheel which is carried by the tool body; and in my U.S. patent application Ser. No. 08/953,453, this operation is effected by a spring-loaded actuating ring which is rotatably briefly relative to the supporting tool body thereby to effect movement of the associated tool bit each time the rotation of the tool body is reversed. Also as noted in my application Ser. No. 08/953, 453, there are several U.S. patents which disclose tools in which the associated cutter elements are moved between operative and inoperative positions by virtue of engagement of a thrust element on the tool with the surface of the workpiece that is to be machined.

In addition to the above-noted tools there also is a U.S. patent Ser. No. 3,572,182, which teaches the manipulation of the cutter blade of a cutting tool by use of a supply of compressed air or hydraulic fluid that is operatively connected to the cutter to manipulate its associated cutter blade.

Among the numerous problems associated with such prior art devices is the fact that much of the movement of the cutter bit relative to the associated cutter body relies upon the rotation of the tool body to produce the desired manipulation of the cutter bit or blade. Thus, any failure of any of the parts that mechanically transmit the rotation of the tool body to the mechanism which manipulates the cutter bit, will result in unsatisfactory manipulation of the cutter bit. Although this is a lesser problem in connection with a cutter bit of the type disclosed by the above-noted U.S. Pat. No. 3,572,182, such fluid pressure operated devices, nevertheless, are rather expensive to construct and install, and require separate valving means used exclusively for controlling the flow of air pressure to and from the associated tool.

It is an object of this invention, therefore, to provide an improved fluid actuated spotfacing and counterboring tool which eliminates the need for employing as part of the tool separate valving means for controlling the flow of operating fluid to and from the tool.

Another object of this invention is to provide an improved spotfacing and counterboring tool of the type described which utilizes a fluid under pressure for moving an associated tool bit from an inoperative to an operative position, and which relies solely upon a spring mechanism for returning the tool bit to its inoperative position.

A further object of this invention is to provide a novel method of utilizing existing pressure operated coolant systems for effecting manipulation of the associated tool bit of an improved tool of the type described herein.

Still other objects of this invention will be apparent hereinafter from the specification and from the recital of the appended claims, particularly when read in conjunction with the accompanying drawings.

SUMMARY OF THE INVENTION

A cylindrical tool holder has therein an axially reciprocable operating rod drivingly connected at one end to a cutter tool bit, which is mounted in a recess in one end of the holder for pivotal movement by the operating rod between an inactive position within the recess, and an active position in which it projects radially from the holder and out of the recess for engagement with a workpiece. The opposite end of the holder is releasably secured in one end of an axial bore in a tool driver, the opposite end of which has secured therein a retention knob that is used for mounting the cutter in a drill press, or the like. The retention knob has therein an axial bore for supplying coolant under pressure through the bore in the driver, and an axial bore in the tool holder to the recess in which the tool bit is mounted, thereby to supply coolant for the tool bit when the latter is in use.

The interconnected ends of the tool holder and tool driver are surrounded by an annular actuator having at one end a reduced-diameter bore that is axially slidable on the driver, and which at its opposite end is drivingly connected to the operating rod, so that the axial movement of the actuator on the driver imparts axial movement to the tool bit operating rod. A stationary valve ring which surrounds the driver within the actuator cooperates with the reduced-diameter end of the actuator to form an expansion chamber which communicates through a plurality of radial ports in the driver with its bore. A plurality of compression springs interposed between the tool bit holder and the actuator normally retain the actuator in a first limit position in which the operating rod causes the tool bit to be retained with the recess in the holder. However, when coolant fluid under pressure is connected to the bore in the retention knob, the fluid flows through the radial ports of the driver and into the expansion chamber to cause the actuator to be shifted against the resistance of the compression springs to a second limit position in which the operating rod is drawn in the direction to cause the tool bit to be swung outwardly to its operative position.

THE DRAWINGS

FIG. 1 is an axial section view through the center of a fluid actuated spotfacing and counterboring tool made according to one embodiment of this invention, the associated fluid actuated piston being shown in its advanced position in which it has caused the associated tool bit to be retracted into an inoperative position within a recess in the cylindrical tool body;

FIG. 2 is a view similar to FIG. 1, but illustrating the fluid actuated piston in its retracted position in which it has caused the associated tool bit to be swung out of the associated recess in the tool body and into an operative or cutting position;

DETAILED DESCRIPTION OF THE PREFERRED EMBODIMENTS

Figure 3:
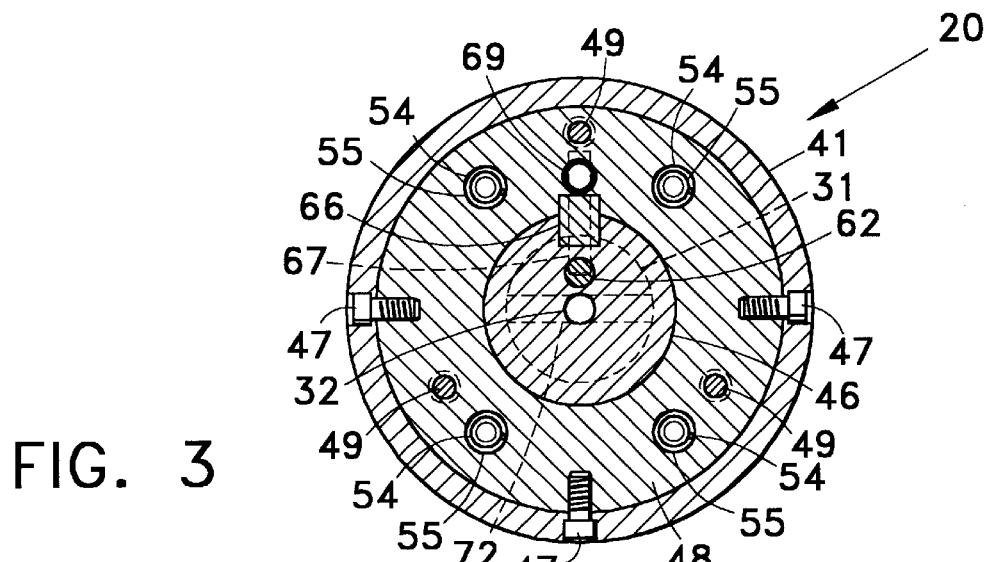
FIG. 3 is a sectional view taken generally along the line 3—3 in FIG. 1 looking in the direction of the arrows.

Referring now to the drawings by numerals of reference, and first to the embodiment shown in FIGS. 1 to 3, 20 denotes generally an automatic fluid actuated spotfacing and counterboring tool having at one end thereof (the right end thereof in FIGS. 1 and 2) a driver body 22, which is circular in cross section, and which has therethrough an axially extending bore 23. For a substantial portion of its axial length driver 22 has formed on one end thereof a cylindrically shaped shank section 24, which terminates at its inner end at one side of an integral, circumferential shoulder 25 that is formed on body 22 intermediate its ends, and which forms no part of this invention. From the other side of shoulder 25 the outer peripheral surface of holder 22 tapers gradually to the right end of the holder as shown in FIGS. 1 and 2, and terminates at a circumferential shoulder 26 which is formed on a conventionally shaped retention knob 27 that is threaded at one end thereof into one end of bore 23. Knob 27, which is utilized in a conventional manner to connect tool 20 to the driving spindle of a drill press, or the like, has therethrough an axial bore 28 which communicates with the bore 23 in the tool body 22.

Projecting coaxially from the end of the tool body 22 remote from the retention knob 27 is an elongate, cylindrically shaped tool bit holder 31 having therethrough an elongate, axial bore 32. At one end thereof (the right end as shown in FIGS. 1 and 2) holder 31 has a slightly reduced diameter shank portion 33, which is secured by a lock screw 34 coaxially in a counterbore in the end of bore 23 remote from the knob 27. Screw 34 is threaded through a radial opening in the tool body shank 24 and projects at its inner end into a radial opening which is formed in the tool holder shank section 33 to communicate with a counterbore formed in section 33 coaxially of, and in communication with the bore 32. Tool holder 31 is thus secured to the body section 22 for rotation therewith, as noted hereinafter, and with its bore 32 in communication with the bore 23 in the tool body 22. The inner end of the tool holder shank 33, which lies on a plane extending diametrally of the bore 23, is positioned adjacent a plurality of openings or ports 36, only two of which are shown in FIGS. 1 and 2, which extend radially through the annular wall of shank 24 at equiangularly spaced points about its axis, and with the axes thereof lying in a diametral plane axially spaced slightly from the plane surface on the inner end of shank 33. The bore 23 of the body 22 thus communicates not only with the axial bore 32 in the holder 31, but also through the ports 36 with the exterior of shank 24 at one side of a stationary, ring-shaped piston 37, which is secured coaxially to the outer peripheral surface of shank 24. The opposite side of piston 37 is engaged with a piston retaining ring 38 which is secured in and projects radially from a circumferential recess formed in shank 24 adjacent to the opening containing the screw 34.

The piston 37 is surrounded coaxially by, and has its outer peripheral surface slidably engaged with, the inner peripheral surface of an annular wall which is formed on one end of a cylindrically shaped hydraulic actuator 41. Actuator 41 has at its opposite end (the right end as shown in FIGS. 1 and 2) a reduced-diameter bore having an inner peripheral surface 42 slidably engaged with the outer peripheral surface of shank 24 of the tool body 22. Piston 37 cooperates with the reduced-diameter end of actuator 41 to form between the annular wall of actuator 41, and the outer peripheral surface of shank 24, an expansion chamber 44 which communicates with the ports 36 for a purpose noted hereinafter.

The end of the actuator 41 remote from its reduced-diameter section (the left end thereof as shown in FIGS. 1 and 2) extends over, and is radially spaced coaxially about a slightly enlarged diameter shoulder section 46 which is formed on the holder 31 just rearwardly of the shank section 33 thereof. Surrounding shoulder section 46 for limited axial sliding movement thereon, and secured by a plurality of screws 47 coaxially in the surrounding end of the actuator 41, is an annular actuator disc 48. Also surrounding the shoulder section 46 for limited axial sliding movement thereon, and secured by a plurality of screws 49 to the plane, outer surface of the inner disc 48, is another annular actuator disc 50, which is generally in similar size to, and which registers coaxially with disc 48. All rotational and axial movement of the actuator 41, is thus transmitted to each of the inner and outer annular discs 48 and 50, respectively.

Secured in a circumferential recess formed in the outer periphery of the shoulder section 46 of holder 31 adjacent shank section 33, is a circular retainer ring 52, a portion of which projects radially beyond the outer surface of section 46. At the side thereof remote from the shank 33, ring 52 is engaged with one side of a circular spring backup ring 53, which is positioned in spaced, confronting relation to the plane inner end of the actuator disc 48. Interposed between the inner end of disc 48 and the backup ring 53 are numerous, coiled compression springs 54, each having one end extending through a registering opening 55 in disc 48, and against the inner end of disc 50. Springs 54 normally urge the interconnected actuator discs 48 and 50, and hence the attached actuator 41 into an advanced or tool bit retracting position as shown in FIG. 1. In this position chamber 44 is reduced to its smallest size, since the springs 54 have caused the actuator 41 to be advanced towards the left on the body 22 to a first limit position in which the reduced-diameter end of the actuator 41 is disposed in closely spaced relation to the piston 37. However, as noted hereinafter, the actuator 41 is capable of being shifted axially on the holder 22, toward the right as shown in FIG. 1, until the right end of the actuator 41 engages and is stopped by a circumferential shoulder 56 formed on the holder shank 24 adjacent the shoulder 25 of the holder. As shown in FIG. 2, when the actuator 41 is in this retracted position, the springs 54 have been compressed, and the chamber 44 has become substantially larger compared to the size thereof when the actuator 41 was in its advanced position.

Mounted for limited axial sliding movement in an elongate, blind bore 61, which is formed in the holder 31 in radially spaced, parallel relation to its bore 32, is a tool bit operating rod 62, the purpose of which will be noted hereinafter. The bore 61, which contains rod 62, opens at one end (the left end in FIGS. 1 and 2) on the exterior holder 31, and at its opposite end extends axially and partway through the portion of holder 31 upon which the shoulder section 46 is formed. Adjacent its inner end operating rod 62 extends parallel to, and registers with an axially extending, radial recess 64 formed in the outer peripheral surface of the shoulder section 46 of the holder 31. Mounted for axial sliding movement in the recess 64 over a slot 65, which is formed on the bottom of the recess to register with the inner end of the operating rod 62, is a slider element 66. Secured intermediate its ends in the slider element 66 medially thereof is a dowel pin 67, one end of which extends through slot 65 and is secured to the operating rod 62 adjacent its inner end. At its opposite end dowel pin 67 extends into registering recesses formed in the confronting faces of the discs 48 and 50, and between the confronting ends of two compression springs 68 and 69, opposite ends of which are seated in registering recesses in the confronting surfaces of the discs 48 and 50.

With this construction, any axial movement of the actuator 41 on shank section 24 of the driver body 22 is transmitted via discs 48 and 50 and their springs 68 and 69 to the dowel pin 67. In turn, any such axial movement of pin 67 is transmitted both to the slider element 67 and to the cutter operating rod 62, by virtue of the connection of the lower end of pin 67 to the inner end of rod 62 as shown in FIGS. 1 and 2.

Adjacent its outer or left end as shown in FIGS. 1 and 2, holder 31 has therein an elongate, generally rectangularly shaped tool bit accommodating recess 71. Pivotally mounted adjacent one end thereof on a pivot pin 72, which is secured in holder 31 to extend transversely of the recess 71, is a pivotal cutter element C. In a manner similar to that disclosed in my pending application Ser. No. 08/953,453, operating rod 62 has formed in a portion thereof which opens on one side of the cutter accommodating notch 71, a rack in the form of a plurality of axially spaced, transversely extending notches or recesses 73 in rod 62 (three in the embodiment illustrated). Notches 73 have meshing, driving engagement with a plurality (three in the embodiment illustrated) of angularly-spaced pins 74, which are secured to the end of the cutter C remote from its cutting end so as to extend transversely across an arcuate groove or slot formed in the pivoted end of the cutter C, and for driving engagement by one of the notches 73 in rod 62. As a consequence, when the operating rod 62 is advanced to the cutter retracting position as shown in FIG. 1, the operating rod 62, via the cooperation of its rack section with the pins 74 on the cutter C, cause the cutter to be swung counterclockwise about the axis of the pivot pin 72 and into a retracted or collapsed position in which it is enclosed within the recess 71 in holder 31. Conversely, when the actuator 41 is shifted toward the right relative to the holder 22, or into the position as shown in FIG. 2, the operating rod 62 is retracted slightly from its position as shown in FIG. 1, thereby its rack section causes the cutter C to be swung or pivoted clockwise into its operative position in which it projects outwardly from the recess 71. Regardless of the position in which the cutter C is disposed, it will be noted as illustrated more clearly in FIG. 1, that the axial bore 32 of the holder 31 opens at one end thereof directly on the recess 71 containing the cutter C.

When the cutter 20 is placed in use, its retention knob 27 is operatively connected to a drill press, or the like, as noted above. The bore 28 in the retention knob is then disposed to be connected to a supply of coolant which is maintained under pressure, and which is disposed to be fed through the retention knob via bore 28 to the bore 23 in the holder 22. For the usual purpose, whenever the cutter is placed in use a portion of the coolant entering bore 23 passes through the bore 32 in the tool holder 31, and into the recess 71 to cool the associated cutter C. However, at the same time, since the supply of coolant is typically maintained under a pressure of anywhere from 30 psi. to 1,000 psi., the fluid coolant entering bore 23 also passes through the ports 36 into the chamber 44, thus creating therein a pressure which causes the activator 41 to be shifted axially rearwardly on the shank 24 of the driver body to the position shown in FIG. 2. This movement of actuator 41 causes retraction of the cutter operating rod 62, which therefore causes the cutter to be swung into its operative position as shown in FIG. 2. As long as the pressure of the coolant is maintained in the bore 23, the activator 41 will remain in its retracted or tool actuating position, notwithstanding the fact that a certain amount of the coolant is discharged from bore 32 against the cutter C and the work that it is operating upon.

However, when the cutting operation ceases, the coolant supply is shut off from the bore 28 in the retention knob 27, and since the remaining coolant fluid in the bore 23 is free to be discharged out of the end of the bore 32 into recess 71, the now-compressed springs 54 begin to expand as the pressure in the chamber 44 drops, and in so doing springs 54 urge the actuator 41 toward the left on shank 24 as shown in FIG. 2, and finally into the tool retracting position as shown in FIG. 1. Thus, simply by employing the pressurized coolant rather than a separate pneumatic or pressurized fluid supply, the present invention allows the coolant not only to cool the operating cutter C, but also to effect actuation of an associated tool bit from a retracted to an advanced, operating position. No separate valving system is necessary to supply fluid under pressure to the tool 20 and also to effect return of the fluid under pressure to the source thereof. On the contrary, the fluid flow is one way, and the only valving mechanism that need be employed is the mechanism which has been employed for turning on and off the flow of coolant to the tool 20.

Moreover, by employing the compression springs 68 and 69, which engage diametrally at opposite sides of the dowel pin 67, such springs function as shock absorbers, thus absorbing any shock which might otherwise be transmitted by the pin 67 through rod 62 to the cutter element C. The same shock absorbing effect prolongs the life of the slider element 66, which reciprocates in the recess 64 in the shoulder section 46 of the holder 31. Also, of course, instead of having to rely upon a pressurized fluid to return the actuator 41 from its retracted to its advanced position, the compression springs 54 automatically perform this function when the supply of coolant under pressure has been removed from the retention knob 27.

Still another advantage of this invention is that, if need be, the holder 31 can be removed from the driver body section 22 simply by removing screws 47 which secure disc 48 to the actuator 41, and then removing screw 34, which then permits disc 48 to be removed from actuator 41, and the shank portion 33 of the holder 31 to be withdrawn from the bore in the driver 22. To enable ready access to the screw 34, an opening 75 is formed in the annular wall portion of the actuator 41 to register with screw 34 when the actuator is in its retracted position.

Figure 4:
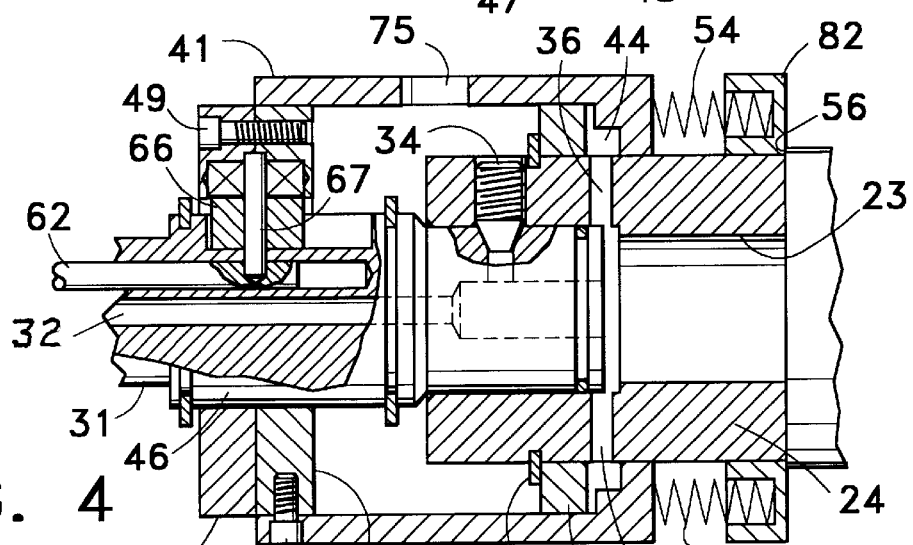
FIG. 4 is a fragmentary, axial sectional view through a tool made according to the second embodiment of this invention, the tool bit operating piston being shown in its advanced position.
Figure 5:
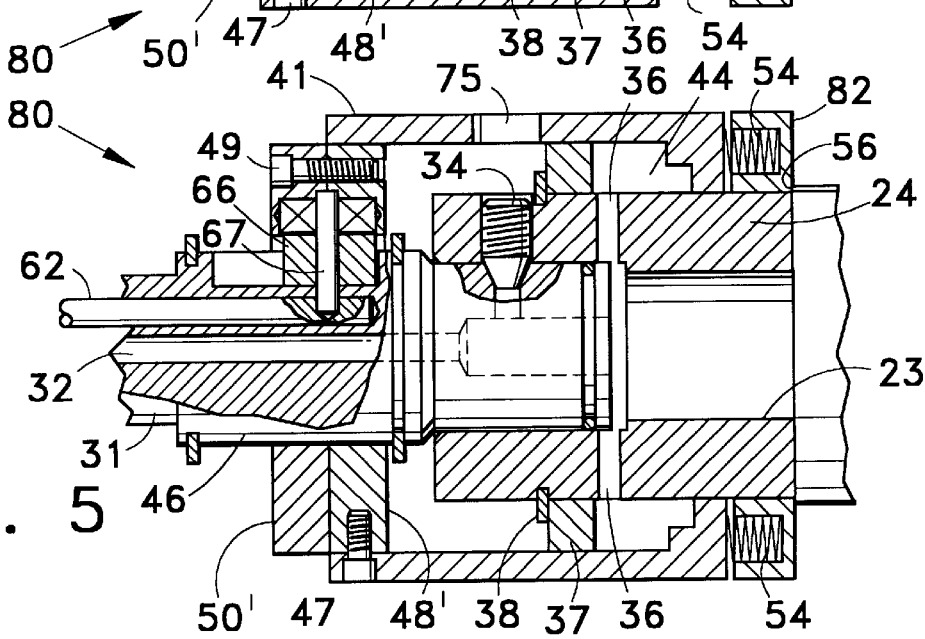
FIG. 5 is a fragmentary axial sectional view of the tool shown in FIG. 4, but with the fluid operating piston being shown in its retracted or tool bit operating position.

Referring now to FIGS. 4 and 5, wherein like numerals are employed to denote elements similar to those employed in the first embodiment, 80 denotes generally a modified cutter which is generally similar to that shown in FIGS. 1 to 3, except that the coiled compression springs 54, which are utilized to return the actuator 41 to its cutter retracting position, are now mounted externally of actuator 41 rather than internally thereof. More specifically, the springs 54 are engaged at one end against the right, reduced-diameter end of the actuator 41, and at their opposite ends are seated in an annular recess formed in the confronting end of a ring-shaped spring retainer 82, which is secured coaxially to the outer peripheral surface of the shank section 24, and against the external, circumferential shoulder 56 that is formed on the driver body 22. In use, coolant fluid that is supplied under pressure to the bore 23 in the body 22 is used not only to cool the associated cutter element (not illustrated in FIGS. 4 and 5), but also to pass through the ports 36 to chamber 44, thereby causing actuator 41 to be shifted toward the right in FIG. 4 against the resistance of the springs 54, and into the retracted position in which the springs are compressed almost within the annular recess in a confronting end of the retainer ring 82. In this embodiment the actuator rings 48' and 50', which are generally similar to those of rings 48 and 50, respectively, in the first embodiment, are slightly different from the latter because there is no need for them to accommodate ends of the springs 54, nor is there any need to employ a spring retainer ring similar to the ring 53 employed in the first embodiment.

From the foregoing it will be apparent that the present invention provides a relatively simple and inexpensive means for providing a fluid actuated mechanism for effecting the shifting of a tool bit between a retracted, inoperative position, and an extended, operative position in which it projects radially outwardly from the associated tool holder. By relying upon the use of the pressurized coolant fluid, which is used in almost all existing cutter mechanisms, it is possible to eliminate the need for employing special valving mechanisms for supplying some other fluid under pressure for effecting movement of a tool bit from an inoperative to an operative position. Moreover by using springs 54 to return a tool bit and an associated activator element 41 to inoperative positions, additional costs are saved by eliminating the need for a special valving mechanism for returning fluid under pressure from the pressure chamber in a tool from the original supply of pressurized fluid. On the contrary, with the present construction, once the supply of coolant to the tool is interrupted, the pressurized coolant already in bore 23 and chamber 44 of the tool merely discharges through the relatively small diameter coolant hole or bore 32 in the tool holder, and to the exterior of the tool through the recess 71. Springs 54 then function automatically to return the tool bit to its inactive position.

While this invention has been illustrated and described in detail in connection with only certain embodiments thereof, it will be apparent that it is capable of still further modification, and that this application is intended to cover any such modifications as may fall within the scope of one skilled in the art, or within the accompanying claims.

I claim:

1. A spotfacing and counterboring tool, comprising
   an elongate tool body having therethrough an axial bore communicating at one end thereof with a recess formed in one end of said body,
   drive means for attaching the opposite end of said body to a machine tool operable to rotate said tool body selectively in opposite directions,
   a cutter blade mounted in said recess for pivotal movement between an inoperative position within said recess, and an operative position in which the blade projects from said recess,
   an operating member mounted for reciprocation in another bore formed in said body in spaced, parallel relation to said axial bore, and extending at one end thereof into said recess and being connected to said blade to effect said pivotal movement thereof upon reciprocation of said member,
   a cutter blade actuator mounted for limited axial reciprocation on said body and cooperating therewith to form on said body an expansion chamber communicating at one end with the axial bore in said body, and being closed at its opposite end by said actuator,
   means connecting said actuator to said operating member to transmit the reciprocation of said actuator to said member, and
   means normally urging said actuator toward said one end of said chamber and into a first limit position in which said operating member has moved said cutter blade to its inoperative position,
   said drive means including means for connecting said axial bore in said tool body to a supply of fluid coolant under pressure operative upon operation of said machine tool to supply coolant through said axial bore to said cutter blade and to said one end of said expansion chamber to cause said chamber to expand and move said actuator away from said one end thereof and into a second limit position in which said operating member has moved said cutter blade to its operative position.

2. A spotfacing and counterboring tool as defined in claim 1, wherein said means connecting said actuator to said operating member includes resilient means interposed between said actuator and said member and operative to permit limited axial movement of said actuator relative to said member each time said actuator approaches one of its limit positions.

3. A spotfacing and counterboring tool as defined in claim 2, wherein said means connecting said actuator to said operating member further comprises
   a pin secured at one end thereof to said member adjacent the end thereof remote from said recess, said pin extending at the opposite end thereof slidably through an axial slot in said tool body, and
   said resilient means comprises a pair of compression springs carried by said actuator for reciprocation therewith, and engaged with diametrically opposite sides, respectively, of said pin adjacent said opposite end thereof.

4. A spotfacing and counterboring tool as defined in claim 1, wherein said means normally urging said actuator to its first limit position comprises spring means interposed between said tool body and said actuator resiliently to resist movement of said actuator to said second limit position thereof, and to urge said actuator back to said first limit position thereof when said machine tool ceases to operate.

5. A spotfacing and counterboring tool as defined in claim 1, wherein said tool body comprises two, separate, axially bored sections, one of said sections having said drive means mounted on one end thereof, the other of said sections having said recess formed in one end thereof, and the opposite ends of said sections being releasably secured to each other with the axial bores thereof disposed in coaxial communication with each other.

6. A spotfacing and counterboring tool as defined in claim 5, including
   manually operable means releasably securing together said opposite ends of said axially bored sections, and
   means on said actuator operative to prevent access to said manually operable means when said actuator is in said second limit position thereof.

7. A spotfacing and counterboring tool as defined in claim 4, wherein upon interruption of the operation of said machine tool and consequent interruption of the supply of fluid coolant to said axial bore in said tool body, the coolant previously supplied to said expansion chamber is allowed to be discharged through said axial bore and said recess to the exterior of said tool body, whereupon said spring means urges said actuator back to said first limit position thereof.

8. In an elongate spotfacing and counterboring tool having therein an axial bore communicating at one end thereof with a recess formed in one end of the tool, a cutter blade pivotally mounted in said recess and drivingly connected to one end of an operating rod mounted to reciprocate between first and second limit positions in another bore formed in the tool in spaced, parallel relation to said axial bore, and operative upon movement between said limit positions to pivot said cutter blade between an inoperative position within said recess, and an operative position in which the cutter blade projects from said recess, the improvement comprising a cutter blade actuator mounted for limited axial reciprocation on said tool and cooperating therewith to form an expansion chamber closed at one end by said actuator, means connecting said operating rod to said actuator for reciprocation thereby between said first and second limit positions thereof, resilient means normally urging said actuator into a first limit position on said tool, whereby said operating rod has moved said cutter blade to its inoperative position, and drive means for releasably connecting the opposite end of said tool to a machine tool for rotation thereby selectively in opposite directions, and for releasably connecting the opposite end of said axial bore remote from said recess to a supply of fluid coolant under pressure, said fluid coolant being operative to flow under pressure from said axial bore into said recess to cool said cutter blade, and into said expansion chamber to urge said actuator against the resistance of said resilient means to a second limit position, thereby expanding said chamber and causing said operating member to move said cutter blade to its operative position.

9. In an elongate spotfacing and counterboring tool as defined in claim 8, wherein said actuator surrounds said tool intermediate the ends thereof and has one end thereof mounted for axial sliding movement on said tool, and has the opposite end thereof drivingly connected to said operating rod, said chamber is closed at said one end thereof by said one end of said actuator, and communicates at its opposite end with the axial bore in said tool, and said resilient means is operative to cause contraction of said chamber and movement of said actuator into a position adjacent said opposite end of said chamber, when said supply of fluid coolant to said opposite end of said axial bore is interrupted.

10. In an elongate spotfacing and counterboring tool as defined in claim 9, wherein said resilient means comprises a plurality of springs surrounded by said actuator, each of said springs being operatively engaged at one end with said tool and at its opposite end with said opposite end of said actuator.

11. In an elongate spotfacing and counterboring tool as defined in claim 9, wherein said resilient means comprises a plurality of springs surrounding said tool, each of said springs being operatively engaged at one end with said tool and at its opposite end with said one end of said actuator.

12. In an elongate spotfacing and counterboring tool as defined in claim 8, wherein said means connecting said operating rod to said actuator comprises lost motion means operative to permit limited axial motion of said actuator and said operating rod relative to search other each time said actuator approaches one of said limit positions thereof, and said lost motion means includes resilient means interposed between said actuator and said operating rod resiliently to transmit the reciprocation of said activator to said operating rod.

13. A method of utilizing a pressurized coolant fluid both for actuating and cooling the cutter blade of a rotatable spotfacing and counterboring tool during the operation thereof, said tool being of the type having therein an axial bore communicating at one end thereof with a recess formed at one end of the tool, and having a cutter blade mounted in said recess for movement between an inoperative position within the recess, and an operative position in which it projects from the recess, comprising providing in the tool an expansion chamber communicating at one end with said axial bore and being closed at its opposite end by a reciprocable cutter blade actuator mounted on the tool normally to be disposed a first limit position in which the actuator maintains said chamber in a contracted mode and the cutter blade in its inoperative position, when the tool is not in operation, connecting the opposite end of the tool to a machine tool for operation thereby, and the opposite end of said axial bore in the tool to a supply of fluid coolant under pressure, and during operation of the tool causing fluid coolant from said source to flow through said axial bore and into said one end of said chamber to cause said chamber to expand and urge said actuator to a second limit position in which the actuator moves the cutter blade to its operative position, and to flow into said recess to cool said cutter blade while in its operative position.

\* \* \* \* \*